United States Patent
Birkenstock et al.

(10) Patent No.: US 10,677,290 B2
(45) Date of Patent: Jun. 9, 2020

(54) WIND TURBINE PITCH BEARING WITH LINE CONTACT ROLLING ELEMENTS

(71) Applicant: General Electric Company, Schenectady, NY (US)

(72) Inventors: Joseph Edward Birkenstock, Fountain Inn, SC (US); William Max Gobeli, Simpsonville, SC (US); Adam Daniel Minadeo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/783,590

(22) Filed: Oct. 13, 2017

(65) Prior Publication Data

US 2019/0113077 A1 Apr. 18, 2019

(51) Int. Cl.
*F16C 19/36* (2006.01)
*F16C 33/58* (2006.01)
(Continued)

(52) U.S. Cl.
CPC ............ *F16C 33/585* (2013.01); *F03D 80/70* (2016.05); *F16C 19/364* (2013.01);
(Continued)

(58) Field of Classification Search
CPC .... F16C 19/364; F16C 19/385; F16C 33/361; F16C 33/581; F16C 33/585; F16C 43/04;
(Continued)

(56) References Cited

U.S. PATENT DOCUMENTS

| | | | | |
|---|---|---|---|---|
| 2,553,536 A | * | 5/1951 | Frenkel | F16C 19/10 384/515 |
| 3,744,863 A | * | 7/1973 | Derner | F16C 19/361 384/571 |

(Continued)

FOREIGN PATENT DOCUMENTS

| | | | | |
|---|---|---|---|---|
| CA | 2787163 A1 | * | 5/2012 | .............. F16C 33/60 |
| DE | 3520814 A1 | * | 12/1986 | ............ F16C 19/361 |

(Continued)

OTHER PUBLICATIONS

EP Search Report, dated Mar. 11 2019.

*Primary Examiner* — Marcus Charles
(74) *Attorney, Agent, or Firm* — Dority & Manning, P.A.

(57) ABSTRACT

A pitch bearing for coupling a rotor blade to a hub of a wind turbine includes an outer race configured to be coupled to the hub, an inner race rotatable relative to the outer race and configured to be coupled to the rotor blade, and a first plurality of line contact rolling elements. The outer race defines a first outer raceway wall and the inner race defines a first inner raceway wall. The first plurality of line contact rolling elements is disposed between the first inner and outer raceway walls. Each of the plurality of line contact rolling elements defines a predetermined contact angle. The predetermined contact angle is defined as an angle between a reference line extending perpendicular to a longitudinal axis of one of the plurality of line contact rolling elements and a reference line extending parallel to a horizontal plane of the pitch bearing. Further, the predetermined contact angle includes angles between 0 degrees (°) and 90°.

14 Claims, 10 Drawing Sheets

(51) Int. Cl.
*F16C 33/36* (2006.01)
*F16C 19/38* (2006.01)
*F03D 80/70* (2016.01)

(52) U.S. Cl.
CPC .......... *F16C 19/383* (2013.01); *F16C 33/366* (2013.01); *F16C 33/581* (2013.01); *F05B 2240/52* (2013.01); *F05B 2260/79* (2013.01); *F16C 2300/14* (2013.01); *F16C 2360/31* (2013.01); *Y02E 10/721* (2013.01); *Y02E 10/74* (2013.01)

(58) Field of Classification Search
CPC F16C 2300/14; F16C 2360/31; F16C 19/383; F16C 33/366; F03D 80/70; F03D 80/80; Y02E 10/721; Y02E 10/74; Y03E 10/726
USPC .............. 384/499, 515, 548, 544, 618, 549; 416/215
See application file for complete search history.

(56) References Cited

U.S. PATENT DOCUMENTS

| | | | | |
|---|---|---|---|---|
| 4,166,659 A * | 9/1979 | Gleichman | ............ | F16C 19/30 384/620 |
| 6,814,493 B2 * | 11/2004 | Wobben | ................ | F03D 7/0204 384/110 |
| 7,084,522 B2 * | 8/2006 | Wobben | ................ | F03D 1/065 290/44 |
| 8,523,453 B2 * | 9/2013 | Loeschner | ............ | F16C 19/49 384/455 |
| 9,062,661 B2 | 6/2015 | Frank | | |
| 9,441,666 B2 | 9/2016 | Hofmann | | |
| 9,458,880 B2 * | 10/2016 | Kari | ........................ | F16C 17/10 |
| 2003/0086631 A1 | 5/2003 | Faltus et al. | | |
| 2010/0092120 A1 * | 4/2010 | Nies | ........................ | F16C 19/10 384/513 |
| 2010/0244454 A1 | 9/2010 | Loeschner et al. | | |
| 2011/0194937 A1 * | 8/2011 | Violette | .................. | B64C 11/06 416/131 |
| 2011/0206310 A1 | 8/2011 | Ventzke | | |
| 2012/0076655 A1 | 3/2012 | Stiesdal | | |
| 2012/0263598 A1 * | 10/2012 | Thomsen | ............ | F03D 11/0008 416/205 |
| 2013/0017089 A1 | 1/2013 | Stiesdal | | |
| 2014/0186185 A1 | 7/2014 | Fox | | |
| 2015/0063736 A1 * | 3/2015 | Minadeo | ............ | F03D 11/0008 384/499 |
| 2015/0071578 A1 * | 3/2015 | Frank | ........................ | F16H 1/28 384/276 |
| 2015/0125104 A1 * | 5/2015 | Kullin | .................. | F16C 19/545 384/558 |
| 2015/0139583 A1 * | 5/2015 | Kullin | .................. | F16C 23/086 384/558 |
| 2016/0047418 A1 * | 2/2016 | Matsui | .................. | F16C 19/364 384/571 |

FOREIGN PATENT DOCUMENTS

| | | | | |
|---|---|---|---|---|
| DE | 203 06 897 U1 | 9/2004 | | |
| DE | 10 2008 049 811 A1 | 4/2010 | | |
| DE | 10 2014 205 816 A1 | 10/2015 | | |
| EP | 1 519 058 A2 | 3/2005 | | |
| EP | 1 741 940 A1 | 1/2007 | | |
| EP | 2511521 A1 * | 10/2012 | .......... | F16C 33/6651 |
| EP | 2610511 A1 | 7/2013 | | |
| EP | 2669541 A1 | 12/2013 | | |
| EP | 1426639 B1 | 7/2015 | | |
| EP | 3173642 A1 | 5/2017 | | |
| GB | 2514845 A * | 12/2014 | .......... | F03D 7/0224 |
| WO | WO-2012175204 A1 * | 12/2012 | .............. | F16C 33/62 |
| WO | WO-2013051422 A1 * | 4/2013 | .............. | F16H 1/32 |

\* cited by examiner

WIND TURBINE PITCH BEARING WITH LINE CONTACT ROLLING ELEMENTS

FIELD

The present subject matter relates generally to wind turbines and, more particularly, to a pitch bearing for a wind turbine utilizing line contact rolling elements.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Further, the wind turbine may include various bearings to facilitate rotation of its various components. Two examples of such bearings include pitch bearings and yaw bearings. More specifically, yaw bearings are configured to rotate the nacelle with respect to the tower as a function of the incoming wind. In addition, pitch bearings are arranged between a blade root of the rotor blades and the hub. Therefore, the pitch bearings rotate or pitch the rotor blades with respect to the incoming wind.

Figure 1:
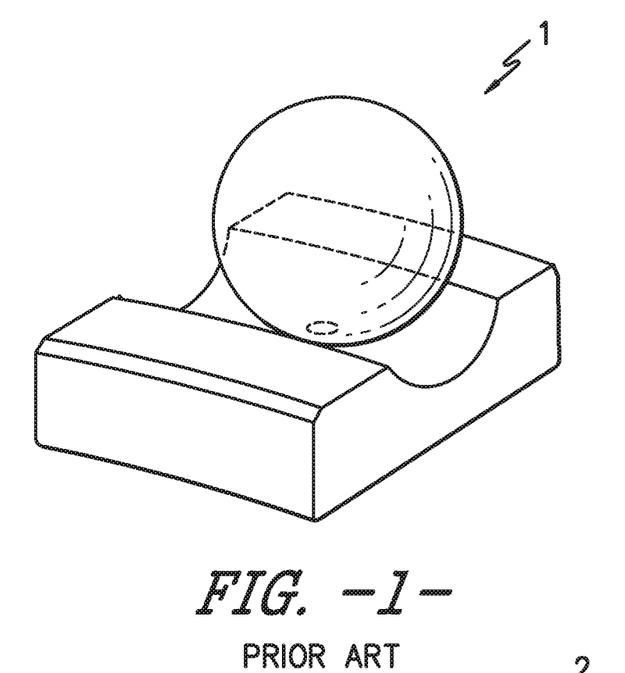
FIG. 1 illustrates a point contact rolling element according to conventional construction.
Figure 2:
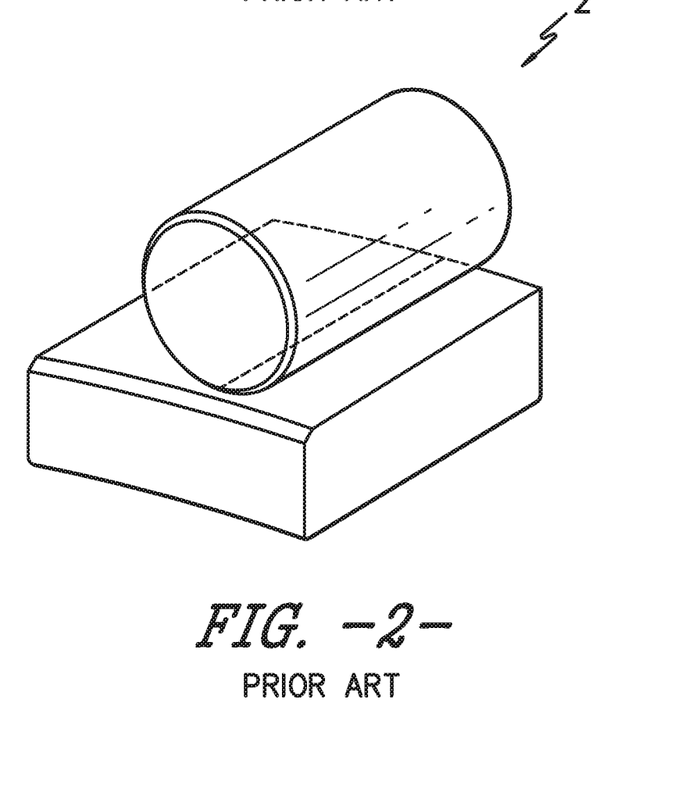
FIG. 2 illustrates a line contact rolling element according to conventional construction.

Such bearings generally include an outer race, an inner race rotatable relative to the outer race, and a plurality of rolling elements therebetween. Many wind turbine bearings include point contact rolling elements, e.g. ball bearings 1, such as those illustrated in FIG. 1. Alternatively, as shown in FIG. 2, some wind turbine bearings may include line contact rolling elements, such as cylindrical rolling elements 2, having a 0° and 90° contact angle configuration.

Figure 3:
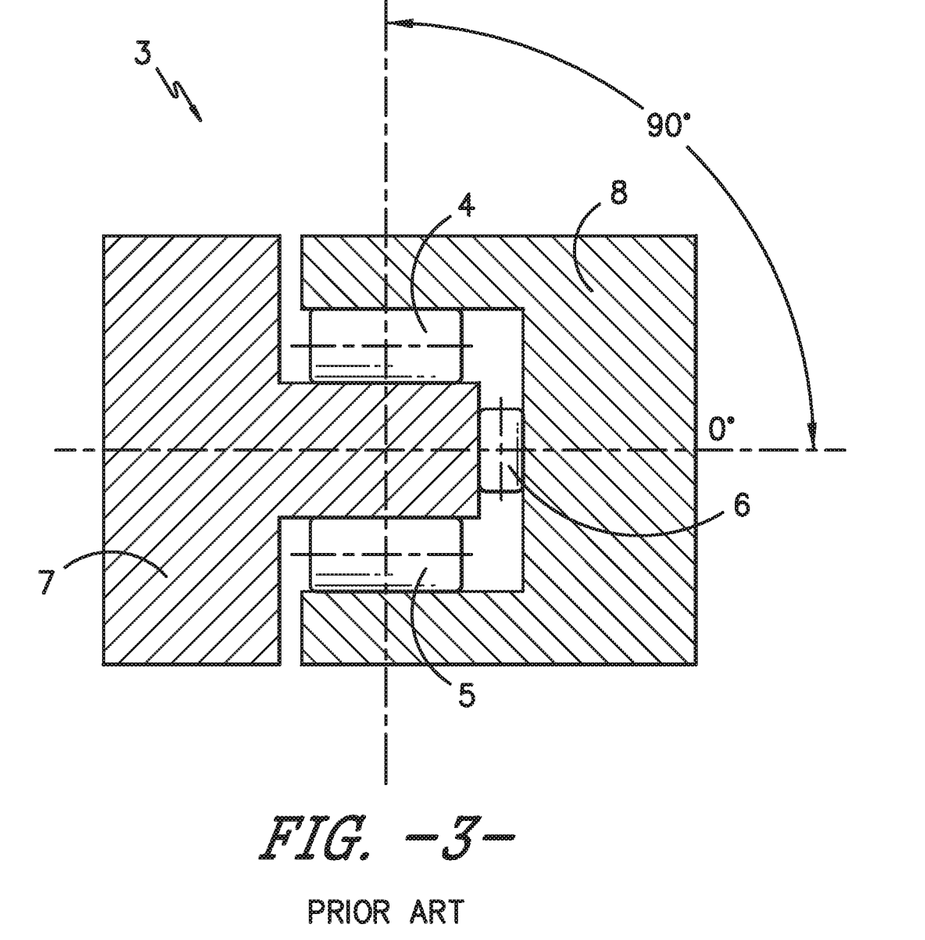
FIG. 3 illustrates a partial, cross-sectional view of a line contact rolling element bearing according to conventional construction.

Conventional line contact rolling elements typically include the rolling elements arranged in a 0° and 90° contact angle configuration. More specifically, as shown in FIG. 3, a partial, cross-sectional view of a line contact rolling element bearing 3 according to conventional construction is illustrated. As shown, the line contact rolling element bearing 3 includes an outer race 7 and an inner race 8 rotatable relative to the outer race 7 via a plurality of line contact rolling elements 4, 5, 6. More specifically, as shown, the upper and lower line contact rolling elements 4, 5 have a 90° contact angle, whereas the middle line contact rolling element 6 has a 0° contact angle.

In such configurations, the rolling elements having a 90° contact angle experience relative sliding therebetween as well as with raceway in order to function. Successful utilization of line contact rolling elements in a 90° contact angle configuration typically relies on operation in lubrication lambda regimes greater than one such that the relative sliding is not detrimental to bearing performance. However, wind turbine pitch bearings experience lambda ratios approaching zero. Thus, when line contact rolling element bearings are used as pitch bearings, such sliding can scuff and wear interface surfaces, generating heat and debris inside the bearing.

Accordingly, a pitch bearing having line contact rolling elements that addresses the aforementioned issues would be welcomed in the technology. In particular, a pitch bearing with less than three rows of line contact rolling elements would be beneficial.

BRIEF DESCRIPTION

Aspects and advantages of the invention will be set forth in part in the following description, or may be obvious from the description, or may be learned through practice of the invention.

In one aspect, the present disclosure is directed to a pitch bearing for coupling a rotor blade to a hub of a wind turbine. The pitch bearing includes an outer race configured to be coupled to the hub, an inner race rotatable relative to the outer race and configured to be coupled to the rotor blade, and a first plurality of line contact rolling elements. The outer race defines a first outer raceway wall and the inner race defines a first inner raceway wall. The first plurality of line contact rolling elements is disposed between the first inner and outer raceway walls. Each of the plurality of line contact rolling elements defines a predetermined contact angle. The predetermined contact angle is defined as an angle between a reference line extending perpendicular to a longitudinal axis of one of the plurality of line contact rolling elements and a reference line extending parallel to a horizontal plane of the pitch bearing. Further, the predetermined contact angle includes angles between 0 degrees (°) and 90°.

In one embodiment, the outer race may further define a second outer raceway wall and the inner race may define a second inner raceway wall. In such embodiments, the pitch bearing may include a second plurality of line contact rolling elements disposed between the second inner and outer raceway walls.

In another embodiment, the first and second plurality of line contact rolling elements may include cylindrical rolling elements.

Alternatively, the first and second plurality of line contact rolling elements may include tapered rolling elements. In such embodiments, reference lines extending parallel to the longitudinal axes of the first and second plurality of tapered rolling elements may converge at a common point of the pitch bearing and define a taper angle. More specifically, in certain embodiments, the inner and outer races may be segments of cones with the rolling elements being tapered so that the conical surfaces of the races and the rolling element axes, if projected, would meet at the same common point on the main axis of the bearing. The convergence of the surfaces of the races and rolling elements defines the taper angle. For example, in certain embodiments, the taper angle may include angles ranging from about 0.25° to about 6°.

In yet another embodiment, the pitch bearing may further include at least one additional plurality of rolling elements. In still a further embodiment, the pitch bearing may also include a raceway rib extending between the first and second plurality of rolling elements.

In another aspect, the present disclosure is directed to a pitch bearing for coupling a rotor blade to a hub of a wind turbine. The pitch bearing includes an outer race configured to be coupled to the hub, an inner race rotatable relative to the outer race and configured to be coupled to the rotor blade, and a first plurality of line contact rolling elements. The outer race defines a first outer raceway wall and the inner race defines a first inner raceway wall. The first plurality of line contact rolling elements is disposed between the first inner and outer raceway walls. Each of the plurality of line contact rolling elements defines a predetermined contact angle. The predetermined contact angle is defined as an angle between a reference line extending perpendicular to a longitudinal axis of one of the plurality of line contact rolling elements and a reference line extending parallel to a horizontal plane of the pitch bearing. Further, the predetermined contact angle includes non-0° angles and non-90° angles. It should be understood that the pitch bearing may further include any of the additional features described herein.

In yet another aspect, the present disclosure is directed to a slewing ring bearing. The slewing ring includes an outer race, an inner race rotatable relative to the outer race, and a plurality of line contact rolling elements. The inner race is positioned relative to the outer race such that at least one raceway is defined between the inner and outer races. The plurality of line contact rolling elements extends circumferentially around the raceway. Each of the plurality of line contact rolling elements defines a predetermined contact angle. The predetermined contact angle is defined as an angle between a reference line extending perpendicular to a longitudinal axis of one of the plurality of line contact rolling elements and a reference line extending parallel to a horizontal plane of the pitch bearing. Further, the predetermined contact angle includes non-0° angles and non-90° angles. It should be understood that the slewing ring bearing may further include any of the additional features described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to bearing configurations for a wind turbine. In several embodiments, a pitch bearing of the wind turbine may include first and second rows of line contact rolling elements arranged between inner and outer races of the bearing. It should be appreciated that the disclosed pitch bearings have been uniquely configured to handle the dynamic loading of a wind turbine. Specifically, due to erratic moment loading and the fact that each pitch bearing is mounted directly to a relatively flexible rotor blade, pitch bearings must be equipped to handle axial and radial loads that can vary significantly with time. As will be described below, the disclosed bearings provide for non-0° and non-90° contact angles, thereby reducing the resultant loads applied through each rolling element and eliminating sliding therebetween. Accordingly, each rolling element may deflect less and, thus, may retain more of an overall share of the entire load, thereby decreasing the stress on the bearing.

It should also be appreciated that, although the present subject matter will be generally described herein with reference to pitch bearings, the disclosed bearing configurations may be utilized within any suitable wind turbine bearing. For instance, yaw bearings are often subject to dynamic loading during operation of a wind turbine. Thus, the disclosed bearing configurations may also be implemented within the yaw bearing of a wind turbine to reduce stresses within the bearing.

Figure 4:
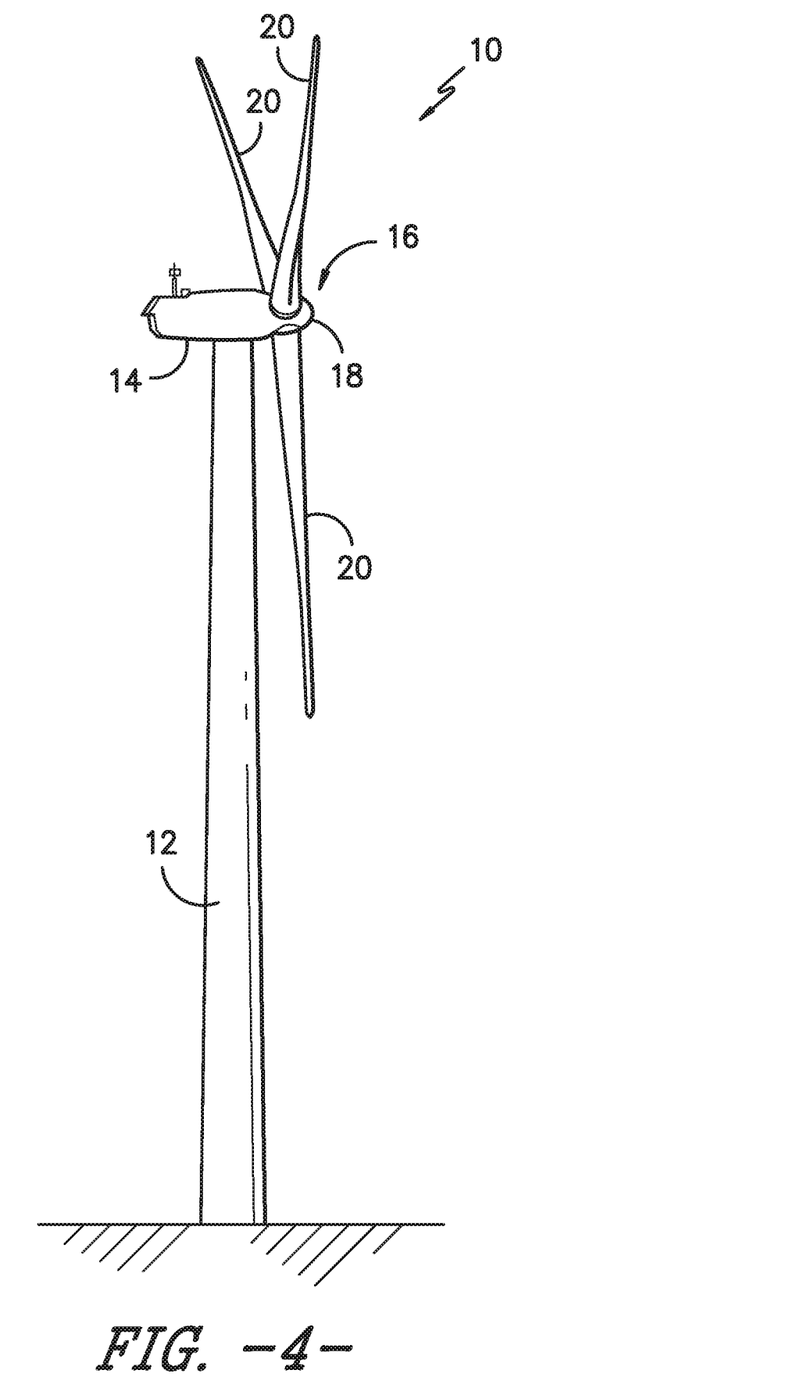
FIG. 4 illustrates a perspective view of one embodiment of a wind turbine according to the present disclosure.

Referring now to the drawings, FIG. 4 illustrates a perspective view of one embodiment of a wind turbine 10 according to the present disclosure. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 25 (FIG. 5) positioned within the nacelle 14 to permit electrical energy to be produced.

Figure 5:
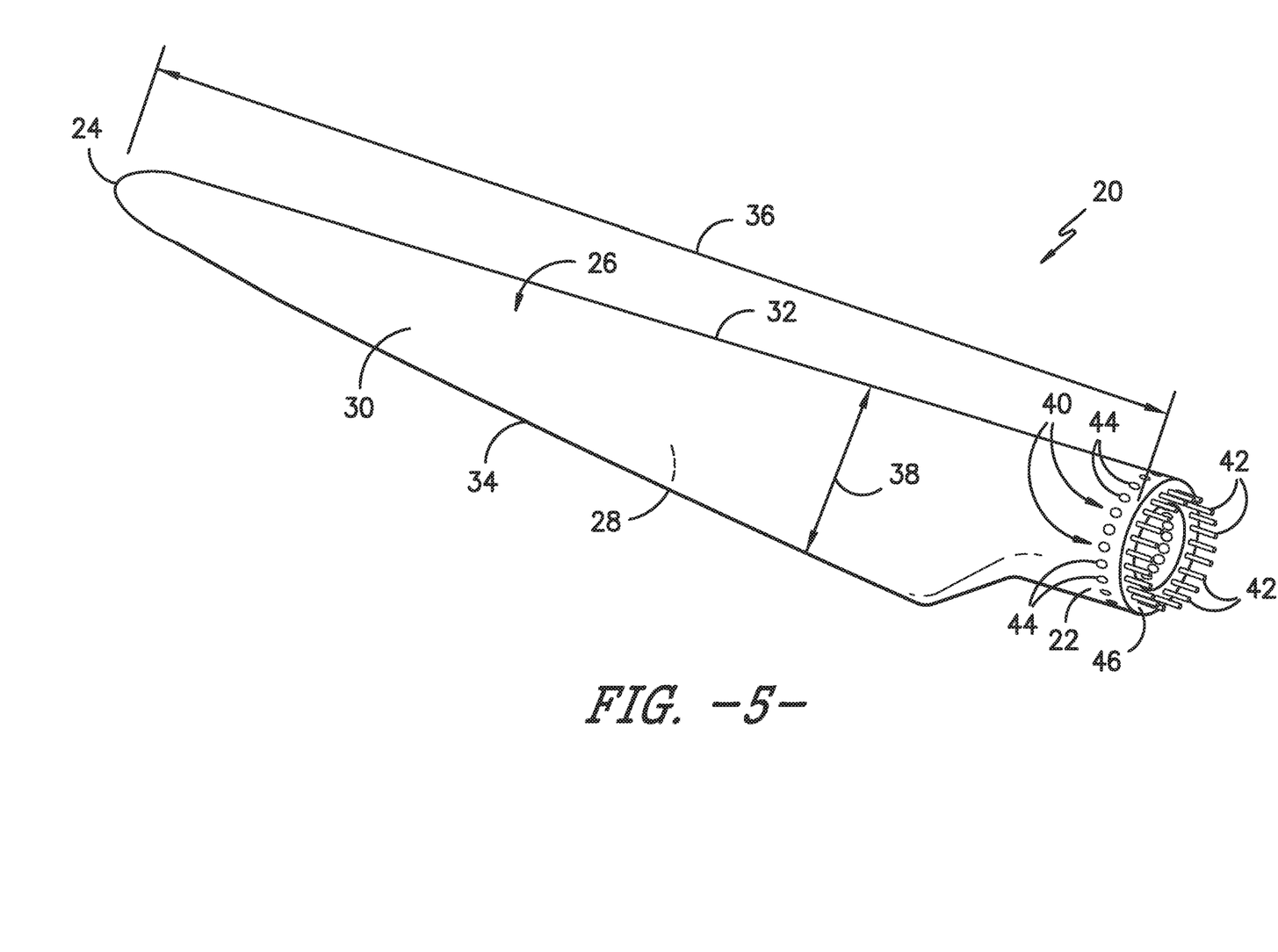
FIG. 5 illustrates a perspective view of one of the rotor blades of the wind turbine shown in FIG. 4.

Referring now to FIG. 5, a perspective view of one of the rotor blades 20 shown in FIG. 4 is illustrated in accordance with aspects of the present subject matter. As shown, the rotor blade 20 includes a blade root 22 configured for mounting the rotor blade 20 to the hub 18 of the wind turbine 10 (FIG. 4) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via one of the pitch bearings 50), as will be described in greater detail below.

Figure 6:
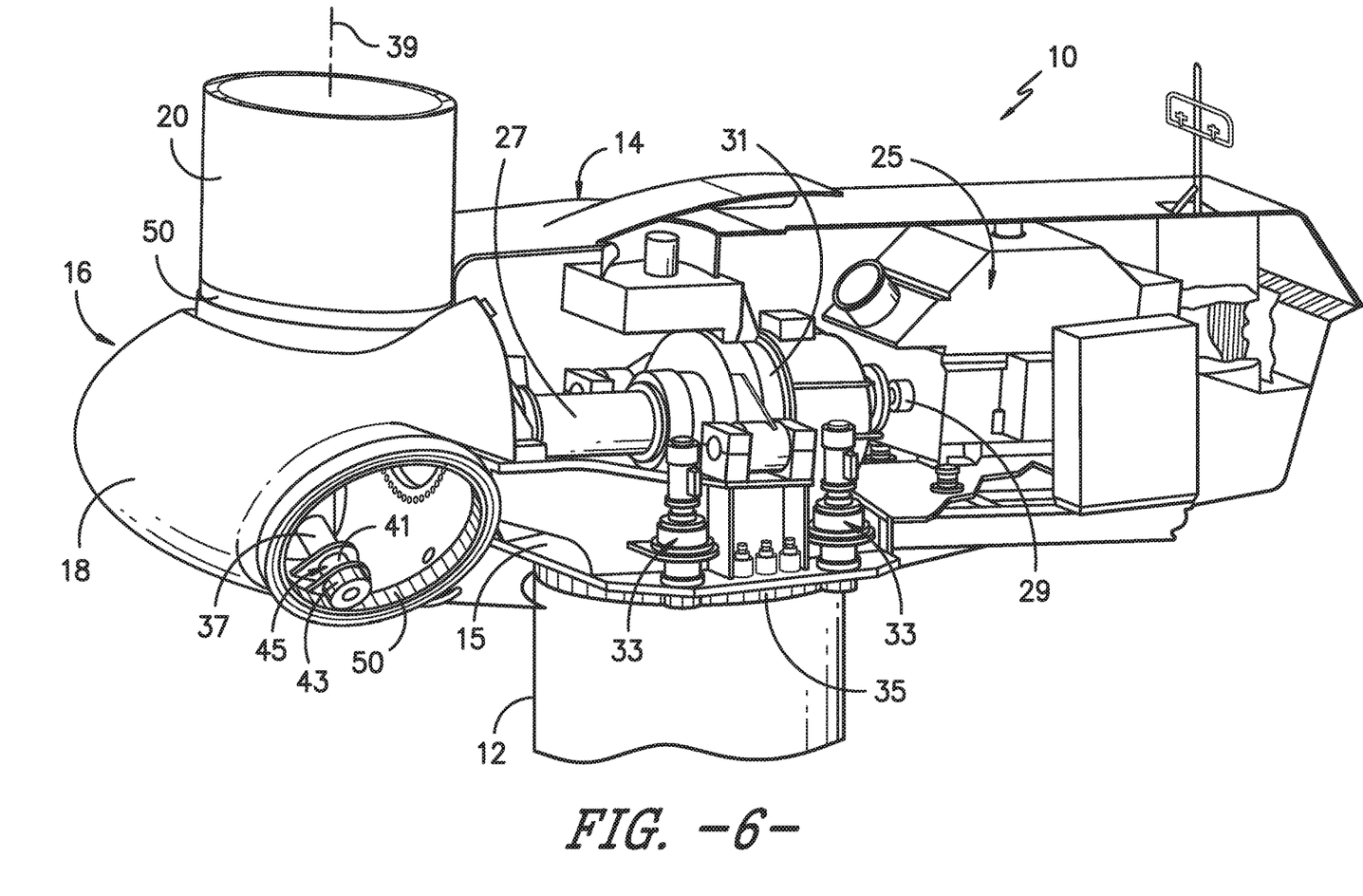
FIG. 6 illustrates a perspective, internal view of the nacelle of the wind turbine shown in FIG. 4.

Referring now to FIG. 6, a simplified, internal view of one embodiment of the nacelle 14 of the wind turbine 10 shown in FIG. 4 is illustrated. As shown, the generator 25 may be disposed within the nacelle 14. In general, the generator 25 may be coupled to the rotor 16 of the wind turbine 10 for generating electrical power from the rotational energy generated by the rotor 16. For example, the rotor 16 may include a rotor shaft 27 coupled to the hub 18 for rotation therewith. The generator 25 may then be coupled to the rotor shaft 27 such that rotation of the rotor shaft 27 drives the generator 25. For instance, in the illustrated embodiment, the generator 25 includes a generator shaft 29 rotatably coupled to the rotor shaft 27 through a gearbox 31. However, in other embodiments, it should be appreciated that the generator shaft 29 may be rotatably coupled directly to the rotor shaft 27. Alternatively, the generator 25 may be directly rotatably coupled to the rotor shaft 27 (often referred to as a "direct-drive wind turbine").

Referring still to FIG. 6, the wind turbine 10 may include numerous slewing ring bearings for allowing rotation of various components of the wind turbine 10. For example, it should be appreciated that, as used herein, the term "slewing ring bearing" may be used to refer to the yaw bearing 35 of the wind turbine 10 and/or one of the pitch bearings 50 of the wind turbine 10. Similarly, it should be appreciated that the slewing ring bearings 35, 50 may generally have any suitable configuration, including one or more of the bearing configurations described below. For instance, in several embodiments, the slewing ring bearings 35, 50 may include an inner race and an outer race rotatable relative to the inner race, with one or more rows of rolling elements being disposed between the inner and outer races.

Additionally, the wind turbine 10 may include one or more yaw drive mechanisms 33 mounted to and/or through a bedplate 15 positioned atop the wind turbine tower 12. Specifically, each yaw drive mechanism 33 may be mounted to and/or through the bedplate 15 so as to engage the yaw bearing 35 coupled between the bedplate 15 and the tower 12 of the wind turbine 10. The yaw bearing 35 may be mounted to the bed plate 15 such that, as the yaw bearing 35 rotates about a yaw axis (not shown) of the wind turbine 10, the bedplate 15 and, thus, the nacelle 14 are similarly rotated about the yaw axis. It should be appreciated that, although the illustrated wind turbine 10 is shown as including two yaw drive mechanisms 33, the wind turbine 10 may generally include any suitable number of yaw drive mechanisms 232.

Referring still to FIG. 6, the wind turbine 10 may also include a plurality of pitch bearings 50 (one of which is shown), with each pitch bearing 50 being coupled between the hub 18 and one of the rotor blades 20. As will be described below, the pitch bearings 50 may be configured to allow each rotor blade 20 to be rotated about its pitch axis 39 (e.g., via a pitch adjustment mechanism 45), thereby allowing the orientation of each blade 20 to be adjusted relative to the direction of the wind.

In general, it should be appreciated that the pitch and yaw drive mechanisms 33, 45 may have any suitable configuration and may include any suitable components known in the art that allow such mechanisms 33, 45 to function as described herein. For example, as shown in the illustrated embodiment, the pitch adjustment mechanism 45 may include a pitch drive motor 37 (e.g., an electric motor), a pitch drive gearbox 41, and a pitch drive pinion 43. In such an embodiment, the pitch drive motor 37 may be coupled to the pitch drive gearbox 41 so that the motor 37 imparts mechanical force to the gearbox 41. Similarly, the gearbox 41 may be coupled to the pitch drive pinion 43 for rotation therewith. The pinion 43 may, in turn, be in rotational engagement with the inner race 54.

Figure 7:
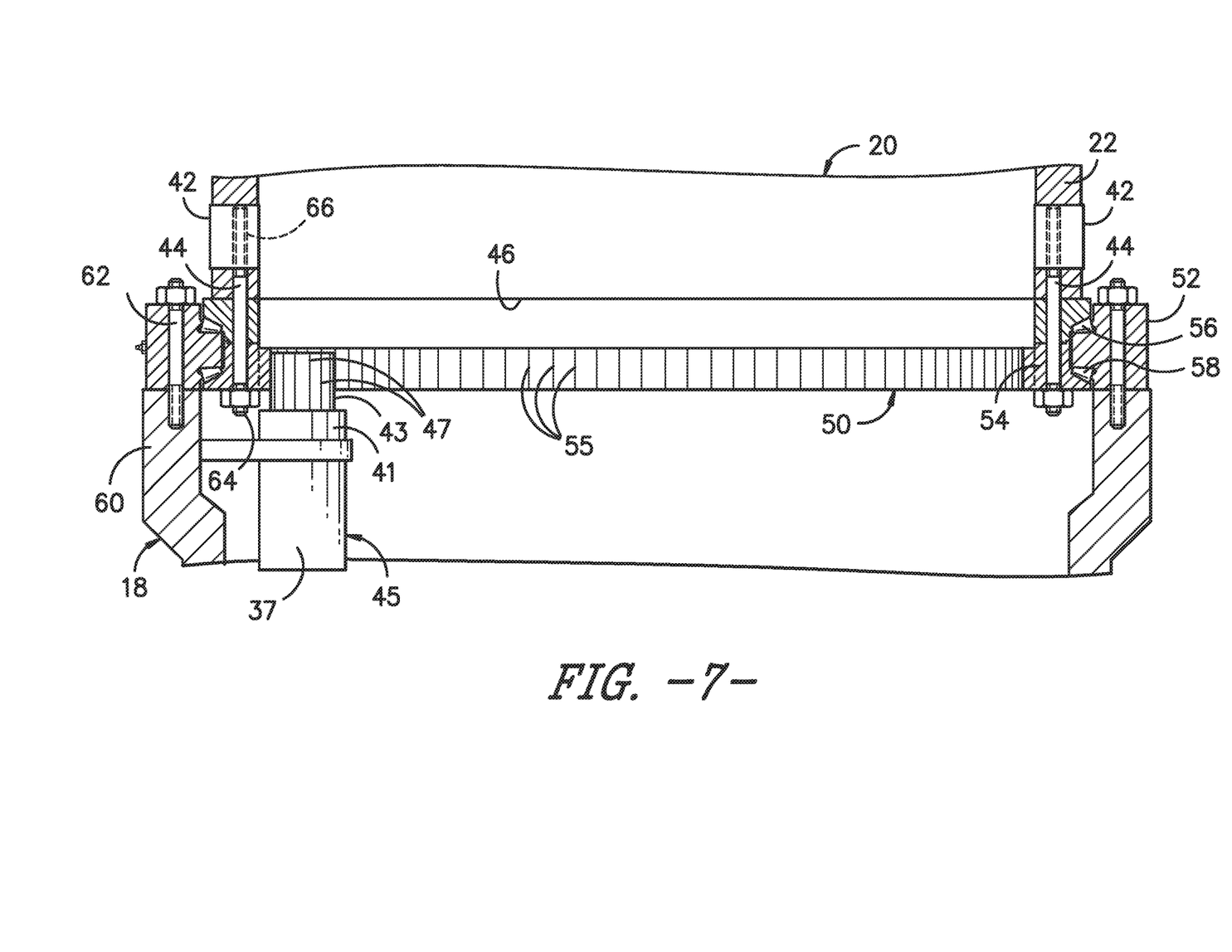
FIG. 7 illustrates a cross-sectional view of one embodiment of a rotor blade coupled to a wind turbine hub via a pitch bearing according to the present disclosure.
Figure 8:
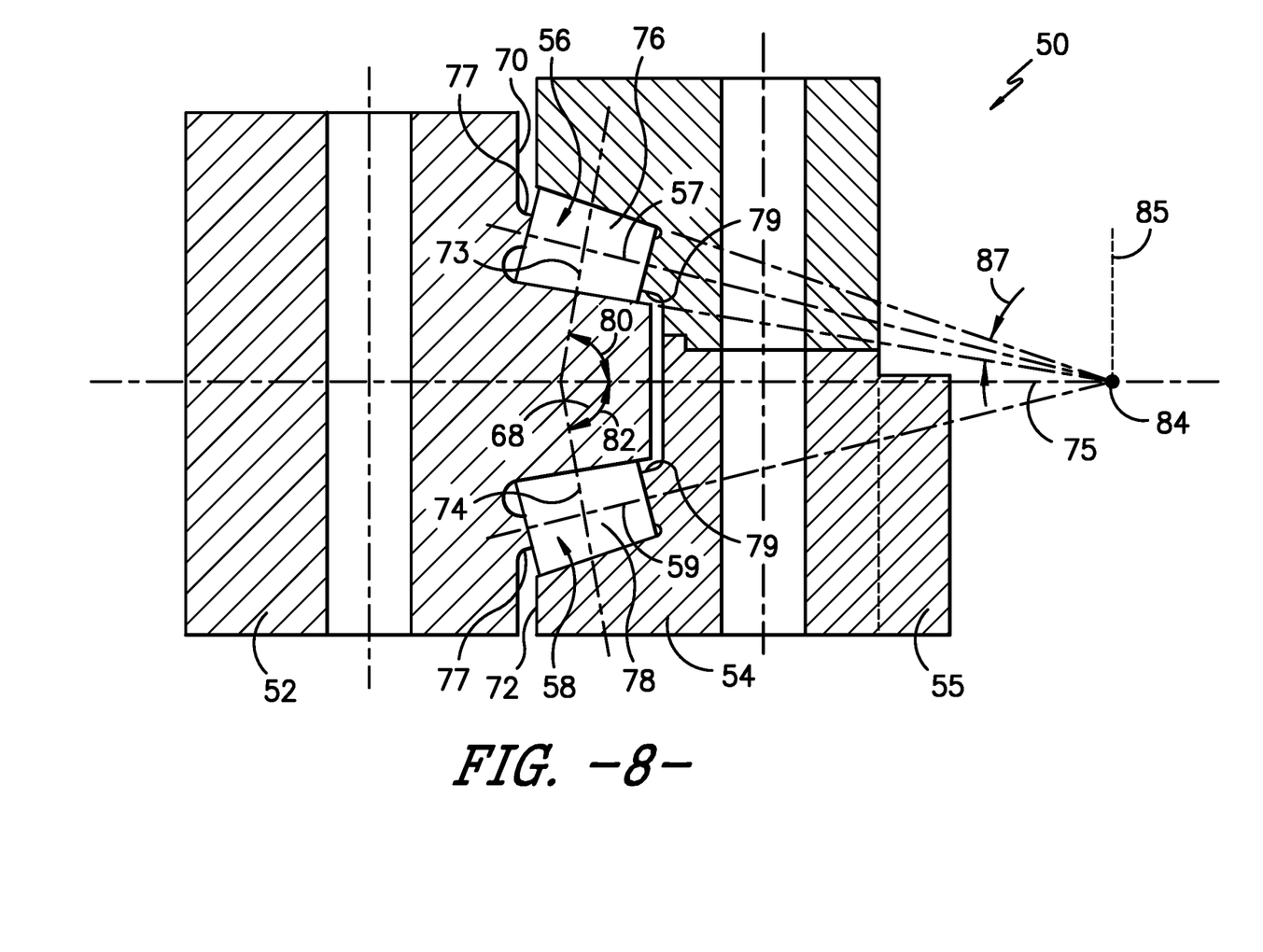
FIG. 8 illustrates a close-up, cross-sectional view of a portion of the pitch bearing illustrated in FIG. 7.
Figure 9:
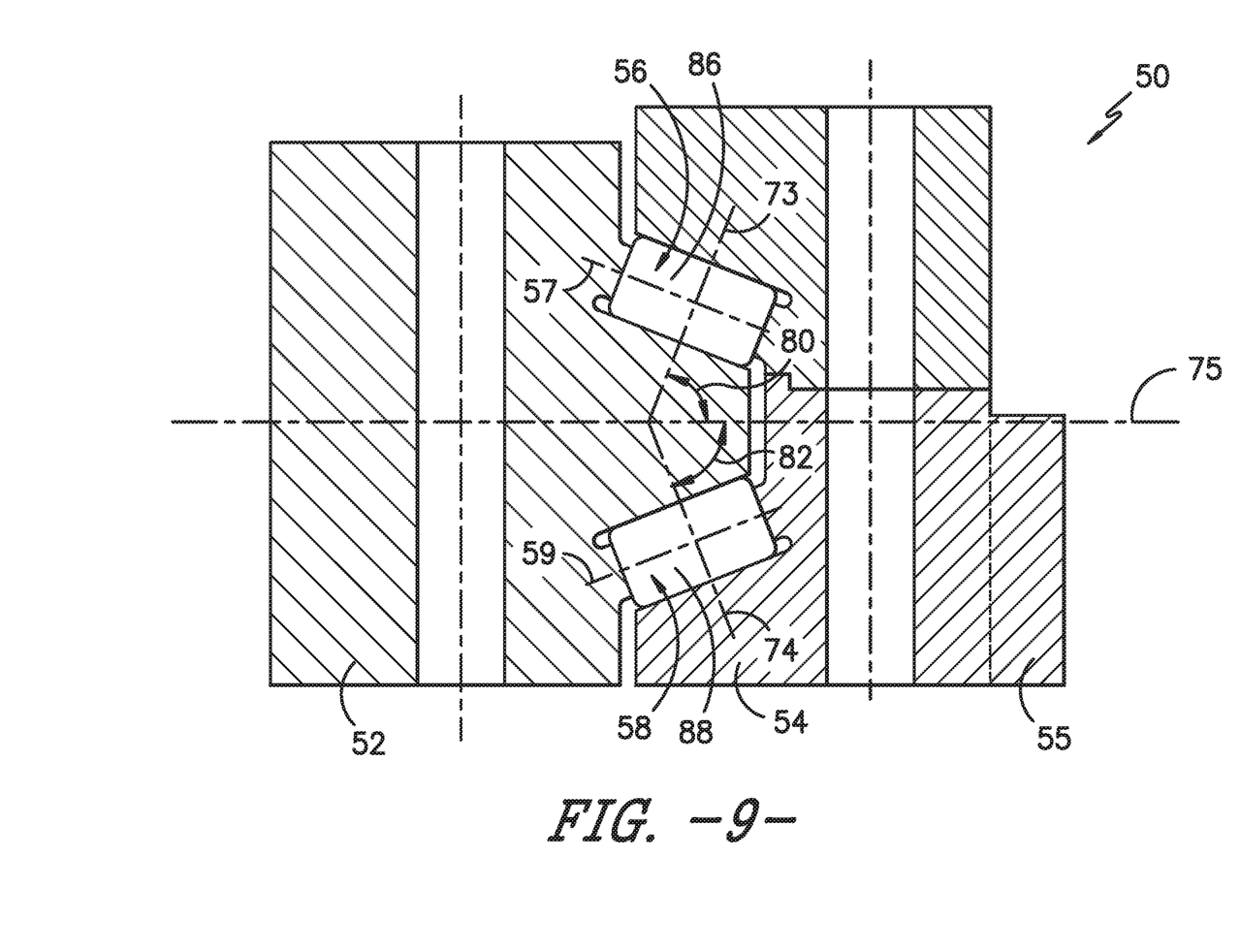
FIG. 9 illustrates a close-up, cross-sectional view of an another embodiment of a portion of the pitch bearing according to the present disclosure.
Figure 10:
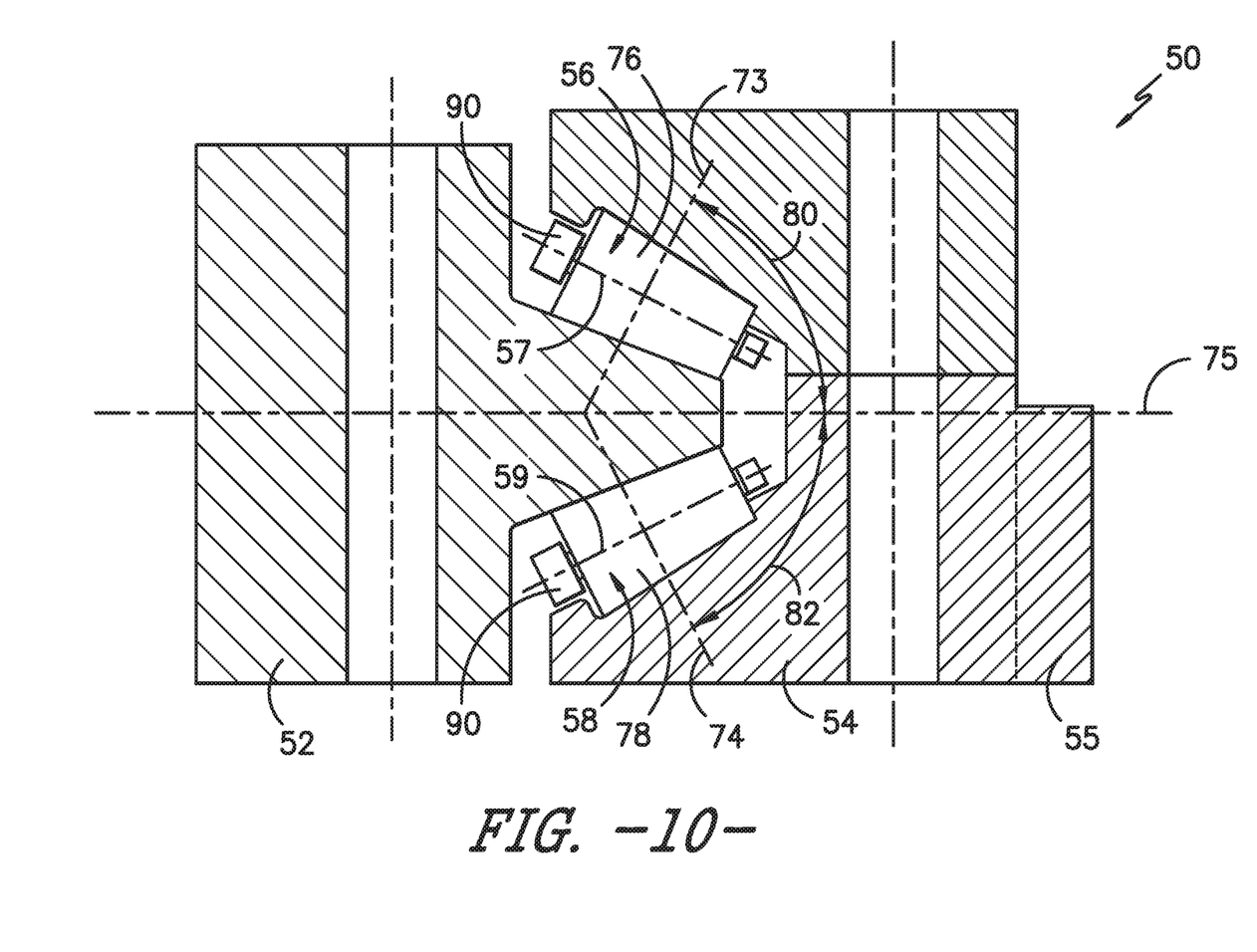
FIG. 10 illustrates a close-up, cross-sectional view of an yet another embodiment of a portion of the pitch bearing according to the present disclosure, particularly illustrating cages configured with the rolling elements.

Referring now to FIGS. 7 and 8, partial, cross-sectional views of the rotor blade 20 shown in FIG. 5 are illustrated, particularly illustrating the rotor blade 20 mounted onto the hub 18 via one of the pitch bearings 50 according to the present disclosure. As shown, the pitch bearing 50 includes an outer bearing race 52, an inner bearing race 54, and a plurality of line contact rolling elements 56, 58 (e.g., a first plurality of rolling elements 56 and a second plurality of rolling elements 58) disposed between the outer and inner races 52, 54. More specifically, as shown in FIGS. 8 and 10, the first and second plurality of line contact rolling elements 56, 58 may include tapered rolling elements 76, 78. Alternatively, as shown in FIG. 9, the first and second plurality of line contact rolling elements 56, 58 may include cylindrical rolling elements 86, 88.

Further, as shown, the outer race 52 may generally be configured to be mounted to a hub flange 60 of the hub 18 using a plurality of hub bolts 62 and/or other suitable fastening mechanisms. Similarly, the inner race 54 may be configured to be mounted to the blade root 22 using the root bolts 44 of the root attachment assemblies 40. For example, as shown in FIG. 7, each root bolt 44 may extend between a first end 64 and a second end 66. The first end 64 may be configured to be coupled to a portion of the inner race 54, such as by coupling the first end 64 to the inner race 54 using an attachment nut and/or other suitable fastening mechanism. The second end 66 of each root bolt 44 may be configured to be coupled to the blade root 22 via the barrel nut 42 of each root attachment assembly 40.

As is generally understood, the inner race 54 may be configured to be rotated relative to the outer race 52 (via the rolling elements 56, 58) to allow the pitch angle of each rotor blade 20 to be adjusted. As shown in FIG. 7, such relative rotation of the outer and inner races 52, 54 may be achieved using a pitch adjustment mechanism 45 mounted within a portion of the hub 18. For example, as shown in FIG. 7, a plurality of gear teeth 55 may be formed along the inner circumference of the inner race 54 of the pitch bearing 50, with the gear teeth 47 being configured to mesh with corresponding gear teeth 47 formed on the pinion 78. Thus, due to meshing of the gear teeth 47, 55, rotation of the pitch drive pinion 43 results in rotation of the inner race 54 relative to the outer race 52 via the plurality of rolling elements 56, 58 and, thus, rotation of the rotor blade 20 relative to the hub 18.

Referring now to FIG. 8, a close-up, cross-sectional view of a portion of the pitch bearing 50 shown in FIG. 7 is illustrated in accordance with aspects of the present subject matter. As shown, the line contact rolling elements 56, 58 are received within separate raceways defined between the inner and outer races 52, 54. Specifically, a first raceway 70 is defined between the inner and outer races 52, 54 for receiving the first plurality of rolling elements 56 and a second raceway 72 is defined between the inner and outer races 52, 54 for receiving the second plurality of rolling elements 58. In such an embodiment, each raceway 70, 72 may be defined by separate walls of the outer and inner races 52, 54. More specifically, as shown, each of the first and second raceways 70, 72 may define a plurality of first and second protrusions 77, 79, respectively.

In addition, as shown, the line contact rolling elements 56, 58 correspond to a first and second plurality of tapered rolling elements 76, 78. In such bearings, the inner and outer races 52, 54 are segments of cones and the rolling elements 56, 58 are tapered so that the conical surfaces of the races 52, 54 and the rolling element axes, if projected, would meet at a common point on the main axis of the bearing 50. This geometry prevents sliding motion between the rolling elements 56, 58 within the outer and inner races 52, 54. For example, as shown in FIG. 8, reference lines 57, 59 drawn through the rolling element axes are projected and converge at common point 84 of the pitch bearing 50. In addition, the surfaces of the races and rolling elements also converge on the same point. As such, the taper angle 87 is designed and chosen to minimize slip of the tapered rolling elements 56, 58. More specifically, in certain embodiments, the taper angle 87 may include angles ranging from about 0.25° to about 6°.

Referring still to FIG. 8, each of the plurality of line contact rolling elements 56, 58 defines a predetermined contact angle 80, 82. More specifically, a first predetermined contact angle 80 is defined as the angle between a reference line 73 extending perpendicular to a longitudinal axis 57 of one of the first plurality of line contact rolling elements 56 and a reference line 75 extending parallel to a horizontal plane of the pitch bearing 50. Similarly, a second predetermined contact angle 82 is defined as the angle between a reference line 74 extending perpendicular to a longitudinal axis 59 of one of the second plurality of line contact rolling elements 58 and a reference line 75 extending parallel to a horizontal plane of the pitch bearing 50. Further, the predetermined contact angles 80, 82 may include any non-0° angles and non-90° angles. For example, in one embodiment, the predetermined contact angles 80, 82 may include angles between 0 degrees (°) and 90°. In addition, the predetermined contact angles 80, 82 may include angles greater than 90° angles.

It should also be appreciated that first and second contact angles 80, 82 may be the same angle or different angles. Specifically, as the contact angle approaches zero degrees, the corresponding rolling elements may be better equipped to handle radial loads whereas, as the contact angle approaches ninety degrees, the corresponding rolling elements may be better equipped to handle axial loads. Thus, by differing the contact angles 80, 82, each row of rolling elements 56, 58 may be stiffer in a given direction, such as by configuring the first plurality of rolling elements 56 to be axially stiffer (e.g., by selecting the first contact angle 80 to be closer to 90 degrees) and the second plurality of rolling elements 58 to be radially stiffer (e.g., by selecting the second contact angle 82 to be closer to 0 degrees).

Figure 11:
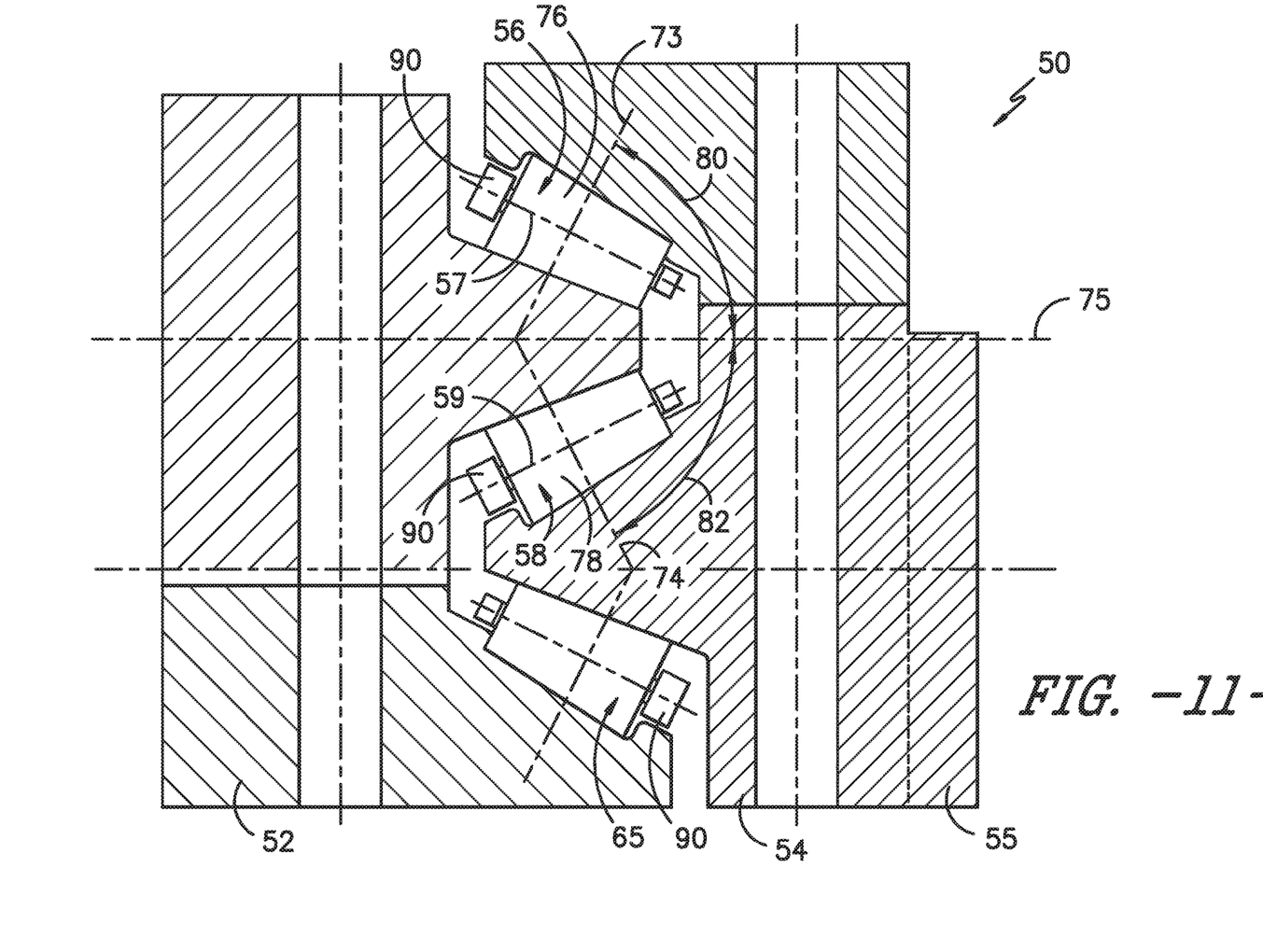
FIG. 11 illustrates a close-up, cross-sectional view of an yet another embodiment of a portion of the pitch bearing according to the present disclosure, particularly illustrating a three-row rolling element configuration.

Even though the bearings described herein are capable of achieving required radial, axial, and moment loading with just two rows of line contact rolling elements, it should further be understood that additional rows may also be utilized as desired. For example, as shown in FIG. 11, the pitch bearing 50 may further include at least one additional plurality of rolling elements 65.

Referring generally to FIGS. 8-10, the pitch bearing 50 may also include a raceway rib 68 at least partially separating the first raceway 70 from the second raceway 72. In several embodiments, the raceway rib 68 may form an extension of the outer race 52. For instance, as shown in the cross-sectional view of FIG. 8, the raceway rib 68 may correspond to a radial projection of the outer race 52 that extends between the line contact rolling elements 56, 58. Alternatively, the raceway rib 68 may be configured to form an extension of the inner race 54. For instance, the raceway rib 68 may correspond to a radial projection of the inner race 54 configured to extend between the rolling elements 56, 58.

It should be appreciated that the rolling elements 56, 58 contained within each row may be spaced apart circumferentially from one another using cages and/or spacers. For example, as shown in FIG. 10, one or more cages 90 may be arranged with the line contact rolling elements 56, 58 to maintain the spacing thereof.

It should also be appreciated that the bearing configuration(s) shown in FIGS. 7-10 may be utilized with any other suitable wind turbine bearing(s). For instance, in several embodiments, the bearing configuration(s) may be utilized within the yaw bearing 35 of the wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch bearing for coupling a rotor blade to a hub of a wind turbine, the pitch bearing comprising:
   an outer race configured to be coupled to the hub, the outer race defining a first outer raceway wall comprising a plurality of first protrusions;
   an inner race rotatable relative to the outer race and configured to be coupled to the rotor blade, the inner race defining a first inner raceway wall comprising a plurality of second protrusions; and,
   a first plurality of line contact rolling elements disposed between the first inner and outer raceway walls such that one of each of the plurality of first and second protrusions fit at least partially within one of the first plurality of line contact rolling elements so as to secure the first line contact rolling element in place, the first plurality of line contact rolling elements comprising tapered rolling elements or cylindrical rolling elements, wherein each of the first plurality of line contact rolling elements defines a predetermined contact angle, the predetermined contact angle defined as an angle between a reference line extending perpendicular to a longitudinal axis of one of the first plurality of line contact rolling elements and a reference line extending parallel to a horizontal plane of the pitch bearing, the predetermined contact angle comprising angles between 0 degrees (°) and 90°.

2. The pitch bearing of claim 1, wherein the outer race defines a second outer raceway wall and the inner race defines a second inner raceway wall, the pitch bearing further comprising a second plurality of line contact rolling elements disposed between the second inner and outer raceway walls, the second plurality of line contact rolling elements comprising tapered rolling elements or cylindrical rolling elements.

3. The pitch bearing of claim 2, wherein the first and second plurality of line contact rolling elements comprise tapered rolling elements, and wherein reference lines extending parallel to the longitudinal axes of the first and second plurality of tapered rolling elements converge at a common point of the pitch bearing and define a taper angle, the taper angle configured to minimize slip of the tapered rolling elements.

4. The pitch bearing of claim 3, wherein the taper angle comprises angles ranging from about 0.25° to about 6°.

5. The pitch bearing of claim 2, further comprising a raceway rib extending between the first and second plurality of rolling elements.

6. The pitch bearing of claim 1, further comprising at least one additional plurality of rolling elements.

7. A pitch bearing for coupling a rotor blade to a hub of a wind turbine, the pitch bearing comprising:
an outer race configured to be coupled to the hub, the outer race defining a first outer raceway wall comprising a plurality of first protrusions;
an inner race rotatable relative to the outer race and configured to be coupled to the rotor blade, the inner race defining a first inner raceway wall comprising a plurality of second protrusions; and,
a first plurality of line contact rolling elements disposed between the first inner and outer raceway walls such that one of each of the plurality of first and second protrusions fit within one of the first plurality of line contact rolling elements so as to secure the first line contact rolling element in place, the first plurality of line contact rolling elements comprising tapered rolling elements or cylindrical rolling elements,
wherein each of the first plurality of line contact rolling elements defines a predetermined contact angle, the predetermined contact angle defined as an angle between a reference line extending perpendicular to a longitudinal axis of one of the first plurality of line contact rolling elements and a reference line extending parallel to a horizontal plane of the pitch bearing, the predetermined contact angle comprising non-0° angles and non-90° angles.

8. The pitch bearing of claim 7, wherein the outer race defines a second outer raceway wall and the inner race defines a second inner raceway wall, the pitch bearing further comprising a second plurality of line contact rolling elements disposed between the second inner and outer raceway walls, the second plurality of line contact rolling elements comprising tapered rolling elements or cylindrical rolling elements.

9. The pitch bearing of claim 8, wherein the first and second plurality of line contact rolling elements comprise tapered rolling elements, and wherein reference lines extending parallel to the longitudinal axes of the first and second plurality of tapered rolling elements converge at a common point of the pitch bearing and define a taper angle, the taper angle configured to minimize slip of the tapered rolling elements.

10. The pitch bearing of claim 9, wherein the taper angle comprises angles ranging from about 0.25° to about 6°.

11. The pitch bearing of claim 7, further comprising at least one additional plurality of rolling elements.

12. The pitch bearing of claim 8, further comprising a raceway rib extending between the first and second plurality of rolling elements.

13. A slewing ring bearing for a wind turbine, the slewing ring bearing comprising:
an outer race;
an inner race rotatably coupled to the outer race, the inner race being positioned relative to the outer races such that at least one raceway is defined between the inner and outer races, the at least one raceway comprising a plurality of first protrusions and a plurality of second protrusions; and,
a plurality of line contact rolling elements spaced circumferentially around the at least one raceway such that one of each of the plurality of first and second protrusions fit within one of the plurality of line contact rolling elements so as to secure the line contact rolling element in place, the plurality of line contact rolling elements comprising tapered rolling elements or cylindrical rolling elements,
each of the plurality of line contact rolling elements defining a predetermined contact angle, the predetermined contact angle defined as an angle between a reference line extending perpendicular to a longitudinal axis of one of the plurality of line contact rolling elements and a reference line extending parallel to a horizontal plane of the pitch bearing, the predetermined contact angle comprising non-0° angles and non-90° angles.

14. The slewing ring bearing of claim 13, wherein the slewing ring bearing comprises at least one of a pitch bearing or a yaw bearing of a wind turbine.

* * * * *